(12) United States Patent
Gutzer

(10) Patent No.: US 11,401,859 B2
(45) Date of Patent: Aug. 2, 2022

(54) DEVICE FOR VARYING A COMPRESSION RATIO, RECIPROCATING-PISTON INTERNAL COMBUSTION ENGINE AND WORKING DEVICE

(71) Applicant: Bayerische Motoren Werke Aktiengesellschaft, Munich (DE)

(72) Inventor: Ulrich Gutzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/284,296

(22) PCT Filed: Oct. 16, 2019

(86) PCT No.: PCT/EP2019/078030
§ 371 (c)(1),
(2) Date: Apr. 9, 2021

(87) PCT Pub. No.: WO2020/099056
PCT Pub. Date: May 22, 2020

(65) Prior Publication Data
US 2021/0340905 A1    Nov. 4, 2021

(30) Foreign Application Priority Data
Nov. 14, 2018   (DE) ..................... 10 2018 128 524.8

(51) Int. Cl.
*F02B 75/04* (2006.01)
*F02D 15/02* (2006.01)
*F16C 3/28* (2006.01)

(52) U.S. Cl.
CPC ............ *F02B 75/048* (2013.01); *F02D 15/02* (2013.01); *F16C 3/28* (2013.01)

(58) Field of Classification Search
CPC .......... F02B 75/048; F02B 75/04; F16C 3/28; F02D 15/00; F02D 15/02
See application file for complete search history.

(56) References Cited

U.S. PATENT DOCUMENTS

| 2014/0096748 | A1 | 4/2014 | Gutzer |
| 2016/0061105 | A1 | 3/2016 | Shen |
| 2018/0306107 | A1* | 10/2018 | Pogam .................... F02D 15/02 |

FOREIGN PATENT DOCUMENTS

| CN | 106996332 A | 8/2017 |
| CN | 107023386 A | 8/2017 |

(Continued)

OTHER PUBLICATIONS

International Search Report (PCT/ISA/210) issued in PCT Application No. PCT/EP2019/078030 dated Feb. 13, 2020 with English translation (eight (8) pages).

(Continued)

*Primary Examiner* — Jacob M Amick
(74) *Attorney, Agent, or Firm* — Crowell & Moring LLP

(57) ABSTRACT

An apparatus configured to change a compression ratio of a reciprocating piston internal combustion engine includes an externally toothed eccentric, an adjusting unit, and a coupling unit. A first takeoff shaft is coupled mechanically to the external toothing system of the eccentric. A second takeoff shaft is coupled mechanically to the adjusting unit. The first and second takeoff shafts of the coupling unit, the eccentric and/or the adjusting unit are configured for the partial or complete arrangement in the interior of a crankcase of the crankshaft, within an installation space of a web of the crankshaft and/or within an installation space of a counterweight.

10 Claims, 5 Drawing Sheets

(56) References Cited

FOREIGN PATENT DOCUMENTS

| | | |
|---|---|---|
| DE | 10 2008 046 821 A1 | 4/2010 |
| DE | 10 2011 018 166 A1 | 10/2012 |
| DE | 10 2017 207 645 A1 | 11/2018 |
| EP | 0 184 042 A2 | 6/1986 |
| EP | 2 454 458 B1 | 5/2013 |
| EP | 2 620 614 A1 | 7/2013 |
| EP | 2 902 603 A1 | 8/2015 |
| EP | 3 267 011 A1 | 1/2018 |
| WO | WO 2011/006537 A1 | 1/2011 |
| WO | WO 2017/129175 A1 | 8/2017 |

OTHER PUBLICATIONS

German-language Written Opinion (PCT/ISA/237) issued in PCT Application No. PCT/EP2019/078030 dated Feb. 13, 2020 (nine (9) pages).
German-language Search Report issued in German Application No. 10 2018 128 524.8 dated Jul. 29, 2019 with partial English translation (16 pages).
Chinese-language Office Action issued in Chinese Application No. 201980057101.3 dated Jan. 5, 2022 (nine (9) pages).

\* cited by examiner

DEVICE FOR VARYING A COMPRESSION RATIO, RECIPROCATING-PISTON INTERNAL COMBUSTION ENGINE AND WORKING DEVICE

BACKGROUND AND SUMMARY OF THE INVENTION

The present disclosure relates to an apparatus for changing a compression ratio of a reciprocating piston internal combustion engine, to a reciprocating piston internal combustion engine per se, and to a working apparatus.

In order to improve the performance of reciprocating piston internal combustion engines with regard to the fuel consumption and the power output, various concepts with a variable compression ratio in a manner which is dependent on a load state of the internal combustion engine have been devised.

In the case of conventional procedures, stability problems are disadvantageously affected in the region of the crankcase, for example on account of an arising thinner design of bearing walls in the region of an adjusting drive which is used and is necessary for the adjustment of the compression ratio.

This disclosure is based on the object of providing an apparatus for changing a compression ratio of a reciprocating piston internal combustion engine, and of providing a reciprocating piston internal combustion engine and a working apparatus which is equipped with the latter, in the case of which the compression ratio of the internal combustion engine can be set by way of particularly simple measures, with a high degree of reliability and without weakening the stability of the construction and impairing the performance of the internal combustion engine which forms the basis.

This and other objects are achieved by way of the features disclosed in this application.

In accordance with a first aspect of the present disclosure, an apparatus for changing a compression ratio of a reciprocating piston internal combustion engine is provided (i) with an externally toothed eccentric which is configured and set up to be arranged in a rotationally movable manner between a pin journal of a crankshaft of a crank drive and a connecting rod eye of a connecting rod in order to change a stroke height of a piston of the reciprocating piston internal combustion engine, which piston is coupled mechanically to the connecting rod, (ii) with an adjusting unit which is coupled mechanically to an external toothing system of the eccentric and is configured to set the eccentric by way of rotation of the eccentric, and (iii) with a coupling unit which is configured to couple the eccentric mechanically to the adjusting unit and, to this end, to first and second takeoff shafts which are arranged parallel to one another, are spaced apart radially from one another, and are coupled mechanically to one another, (iv) the first takeoff shaft being coupled mechanically to the external toothing system of the eccentric, and the second takeoff shaft being coupled mechanically to the adjusting unit, and (v) the coupling unit and, in particular, the first and second takeoff shafts, the eccentric and/or the adjusting unit being configured for the partial or complete arrangement (a) in the interior of a crankcase of the crankshaft, (b) within an installation space of a web of the crankshaft and/or (c) within an installation space of a counterweight.

This viewpoint of the present disclosure observes aspects of a compact design without stability losses as a result of the use of a coupling unit with two takeoff shafts and their partial or complete accommodation (a) in the interior of a housing of the crankshaft, (b) within an installation space of a web of the crankshaft and/or (c) within an installation space of a counterweight.

In the case of this viewpoint of the apparatus according to the disclosure, the adjusting unit preferably has an adjusting gear which is configured as an internal gear with an external toothing system for receiving an adjusting movement for the eccentric, and is configured with an internal toothing system fixedly with respect to the external toothing system for conjoint rotation for mechanical coupling to the coupling unit. A particularly compact overall design can be achieved by way of said measures as a result of suitable accommodation of the adjusting unit with the internal gear in the case of simplified assembly at the same time.

For reasons of further increasing the compactness, the coupling unit, the eccentric and/or the adjusting unit can be configured for the partial or complete arrangement (a) in the interior of a crankcase of the crankshaft, (b) within an installation space of a web of the crankshaft, and/or (c) within an installation space of a counterweight.

In addition or as an alternative, the coupling unit can be arranged partially or completely in the interior of the installation space of the adjusting gear.

In accordance with an alternative viewpoint of the present disclosure, an apparatus for changing a compression ratio of a reciprocating piston internal combustion engine is provided, (i) with an externally toothed eccentric which is configured and set up to be arranged in a rotationally movable manner between a pin journal of a crankshaft of a crank drive and a connecting rod eye of a connecting rod in order to change a stroke height of a piston of the reciprocating piston internal combustion engine, which piston is coupled mechanically to the connecting rod, (ii) with an adjusting unit which is coupled mechanically to an external toothing system of the eccentric and is configured to set the eccentric by way of rotation of the eccentric, and (iii') with a coupling unit for coupling the eccentric mechanically to the adjusting unit, (iv) the adjusting unit having an adjusting gear which is configured as an internal gear with an external toothing system for receiving an adjusting movement for the eccentric, and being configured with an internal toothing system fixedly with respect to the external toothing system for conjoint rotation for mechanical coupling to the coupling unit, and (vii) the coupling unit, the eccentric and/or the adjusting unit being configured for the partial or complete arrangement (a) in the interior of a crankcase of the crankshaft, (b) within an installation space of a web of the crankshaft, and/or (c) within an installation space of a counterweight, and/or (viii) the coupling unit being arranged partially or completely in the interior of the installation space of the adjusting gear.

This alternative viewpoint of the present disclosure considers aspects of a compact design without stability losses as a result of the use of an internal gear as an adjusting gear of an adjusting unit with partial or complete accommodation of the coupling unit (a) in the interior of a crankcase of the crankshaft, (b) within an installation space of a web of the crankshaft, (c) within an installation space of a counterweight, and/or (d) in the interior of that installation space of the adjusting gear which in practice surrounds and envelops the movement travel of the crankshaft webs.

This alternative procedure can be combined with the first concept according to the disclosure, by, in accordance with one preferred embodiment of the apparatus according to the disclosure, the coupling unit being configured for coupling the eccentric mechanically to the adjusting unit by way of first and second takeoff shafts which are arranged parallel to one another, are spaced apart radially from one another, and are coupled mechanically to one another.

In accordance with another exemplary embodiment of the apparatus according to the disclosure, the coupling unit can be configured as a mechanism unit which circulates in the interior space of the crankcase, and/or in the installation space of a web of the crankshaft, and, in particular, of a counterweight. An even higher degree of compactness is achieved by way of said measures.

In addition or as an alternative, the first takeoff shaft of the coupling unit can be configured to be arranged spaced apart in parallel and radially with respect to a rotational axis of the crankshaft.

The first takeoff shaft preferably has an externally toothed first gearwheel for the rotation of the eccentric, and, as an alternative or in addition, is configured with a second gearwheel of the first takeoff shaft offset axially and fixedly with respect to the first gearwheel of the first takeoff shaft for conjoint rotation.

In another development of the apparatus according to the disclosure, the second takeoff shaft of the coupling unit is configured to be arranged spaced apart in parallel and radially with respect to the rotational axis of the crankshaft and with respect to the first takeoff shaft.

In addition or as an alternative, the second takeoff shaft can have an externally toothed first gearwheel so as to mesh with the second gearwheel of the first takeoff shaft, and/or can be configured with an externally toothed second gearwheel of the second takeoff shaft offset axially and fixedly with respect to the first gearwheel of the second takeoff shaft for conjoint rotation.

In this context, it is particularly advantageous if, in accordance with another exemplary embodiment of the apparatus according to the disclosure, the second gearwheel of the second takeoff shaft is arranged so as to mesh on the internal toothing system of the adjusting gear.

For the actual drive of the eccentric and therefore for the actual adjustment of the compression ratio, it is particularly advantageous if, in addition or as an alternative, the external toothing system of the adjusting gear is arranged and configured so as to engage with an adjusting device.

An adjusting device of this type can be formed, for example, by a worm drive and/or a rack.

Furthermore, it is particularly advantageous if the adjusting gear is configured for rotatable mounting in the interior space of a crankcase of the reciprocating piston internal combustion engine.

Arrangements have been considered up to now, in the case of which there is a relatively direct mechanical attachment between firstly the eccentric and secondly the adjusting unit. It is frequently advantageous, however, if additional intermediate elements are provided, by way of which other components can be driven in a controlled manner.

For instance, it is particularly advantageous if, in the case of another embodiment of the apparatus according to the disclosure, an intermediate mechanism is configured, in particular as part of the coupling unit, with an externally toothed intermediate gearwheel, or with an intermediate shaft which supports an externally toothed intermediate gearwheel.

An intermediate shaft of this type can be configured spaced apart in parallel and radially with respect to the crankshaft axis and/or with respect to the first and second takeoff shaft.

In the case of said embodiment, the intermediate mechanism is set up according to the disclosure to bring about, indirectly or directly, mechanical coupling and, in particular, meshing, in particular of the first gearwheel of the first takeoff shaft, to/with the external toothing system of the eccentric.

In these circumstances, furthermore, it is advantageous if a synchronizing mechanism is configured here, in particular as part of the coupling unit and/or the or an intermediate mechanism, with an externally toothed synchronizing gearwheel, a synchronizing shaft which supports an externally toothed synchronizing gearwheel, and/or spaced apart in parallel and/or in a coinciding manner or radially with respect to the crankshaft axis, with respect to any intermediate shaft and/or with respect to the first and second takeoff shaft, in order to change a compression ratio of further cylinders of the reciprocating piston internal combustion engine.

In this case, the synchronizing mechanism is set up to bring about, indirectly or directly, mechanical coupling and, in particular, meshing, in particular of the synchronizing gearwheel to/with the external toothing system of the eccentric, and/or to be driven by way of this, and, in particular, in addition to/with the coupling unit, the intermediate mechanism and/or the intermediate gearwheel, in particular in order to drive the eccentric.

These measures provide possibilities to drive and adjust the eccentric for boosting of the compression ratio either directly or indirectly, namely by way of the synchronizing mechanism, the synchronization taking place by way of the eccentric in the case of the direct drive and adjustment.

Furthermore, the present disclosure provides a reciprocating piston internal combustion engine per se which is configured with a crank drive with a crankshaft with at least one pin journal which is mounted on both sides in a rotationally movable manner, the pin journal being operatively connected to a connecting rod and a piston which is arranged in a cylinder of the reciprocating piston internal combustion engine such that it can be moved slidingly, and being configured and set up for the conversion of a rotational movement of the crankshaft into a bidirectional, translational movement of the piston with a defined stroke height. In order to change a compression ratio of the reciprocating piston internal combustion engine, the latter has an apparatus designed according to the disclosure for changing the compression ratio of the reciprocating piston internal combustion engine.

Furthermore, the subject matter of the present disclosure is also a working apparatus which has a reciprocating piston internal combustion engine which is designed according to the disclosure and is configured as a drive means for an assembly of the working apparatus.

Other objects, advantages and novel features of the present disclosure will become apparent from the following detailed description of one or more preferred embodiments when considered in conjunction with the accompanying drawings.

DETAILED DESCRIPTION OF THE DRAWINGS

In the following text, exemplary embodiments and the technical background of the disclosure will be described in detail with reference to FIGS. 1 to 5. Identical, equivalent and identically or equivalently acting elements and components are denoted by way of the same designations. The detailed description of the denoted elements and components is not repeated in every case where they occur.

The features and further properties which are shown can be used on their own in any desired form and combined in any desired manner with one another, without departing from the core concept of the disclosure.

Figure 1:
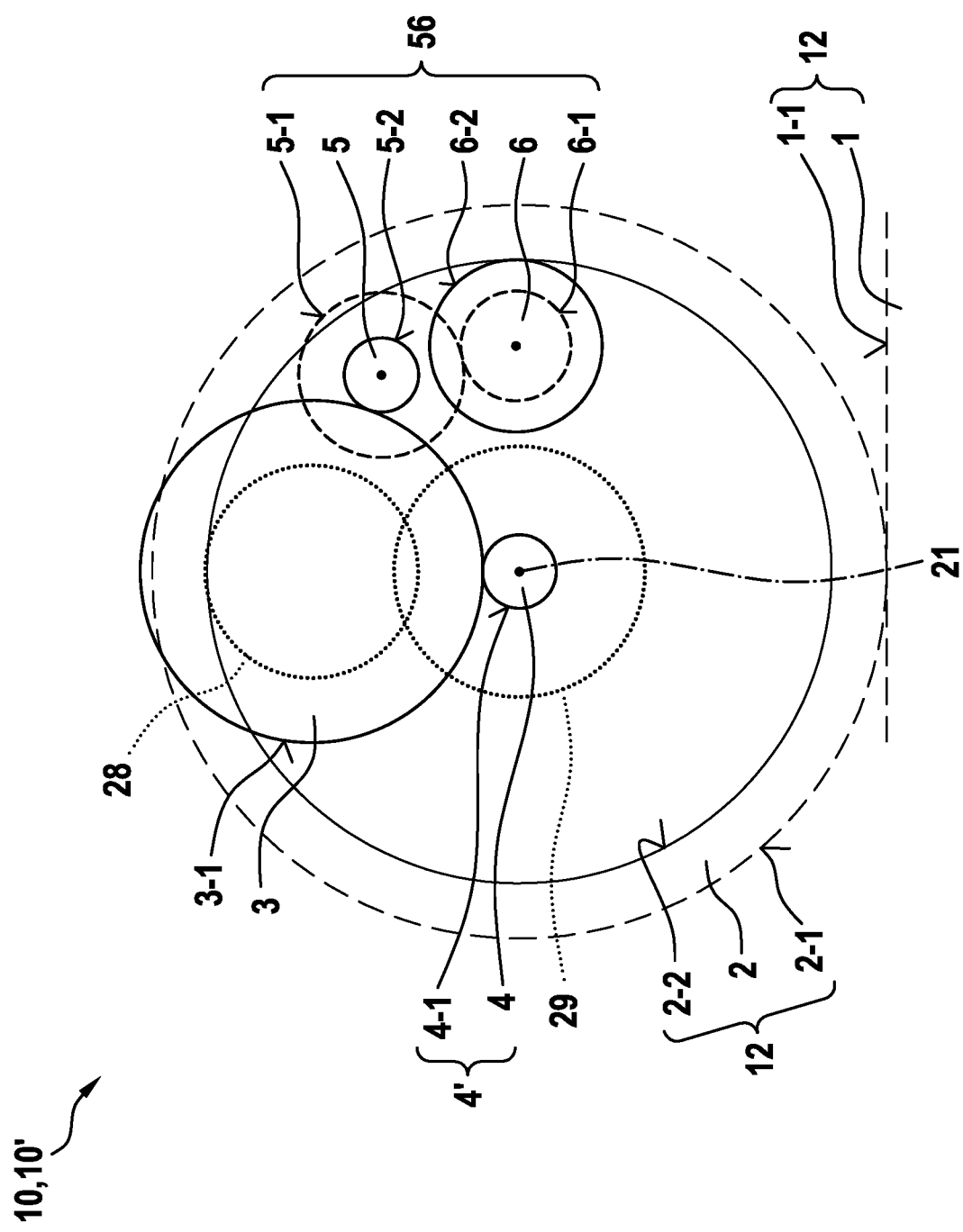
FIG. 1 shows an axial plan view of the apparatus for changing a compression ratio of a reciprocating piston internal combustion engine with a coupling unit between an eccentric and an adjusting unit, a synchronizing mechanism being actuated by way of the eccentric.

FIG. 1 shows an axial plan view of one embodiment of the apparatus 10 for changing a compression ratio of a reciprocating piston internal combustion engine 100 with a coupling unit 56 between an eccentric 3 and an adjusting unit 12, a synchronizing mechanism 4' being actuated by way of the eccentric 3.

Figure 3:
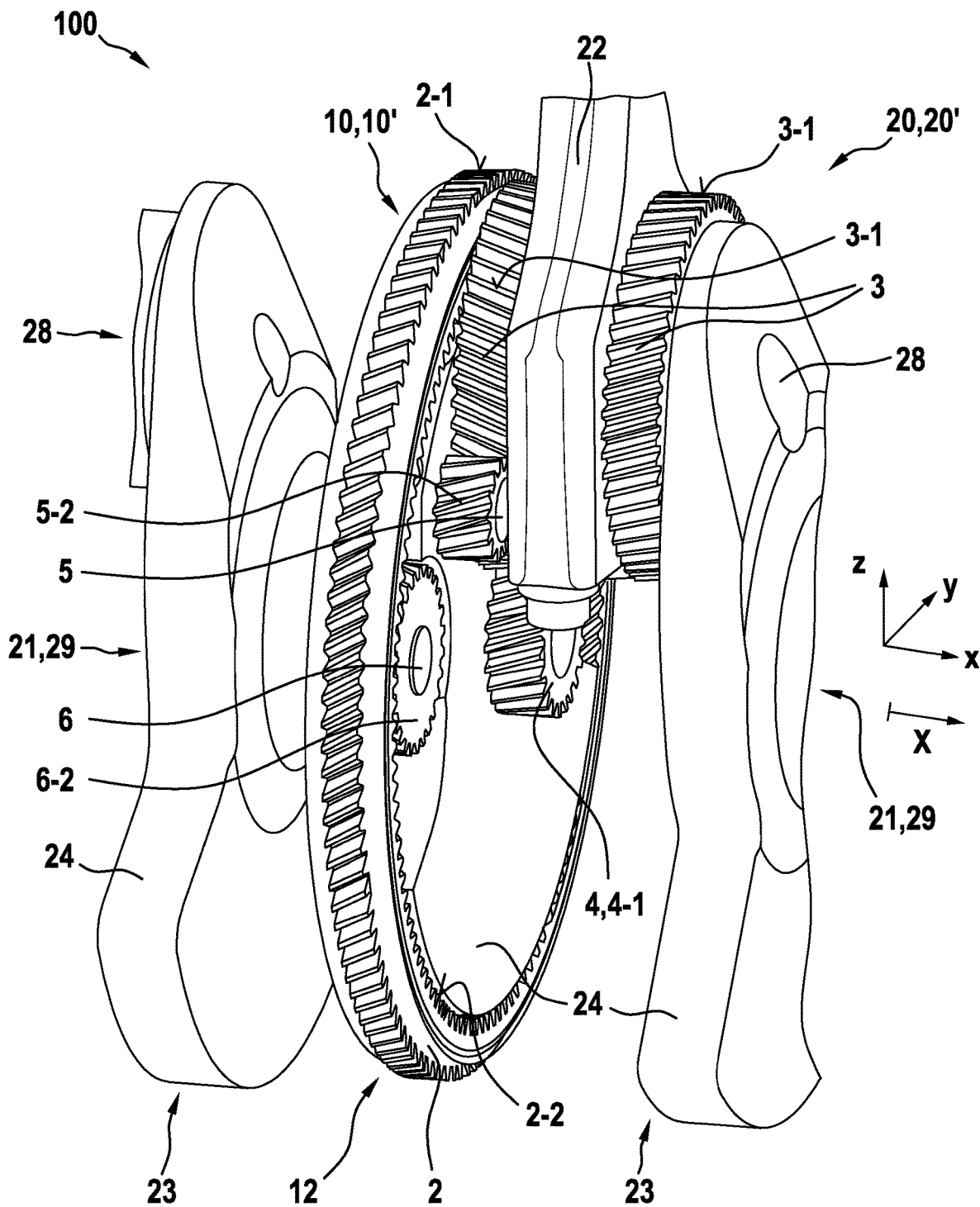
FIGS. 3 to 5 show various perspective views of the apparatus for changing a compression ratio according to FIG. 1.
Figure 4:
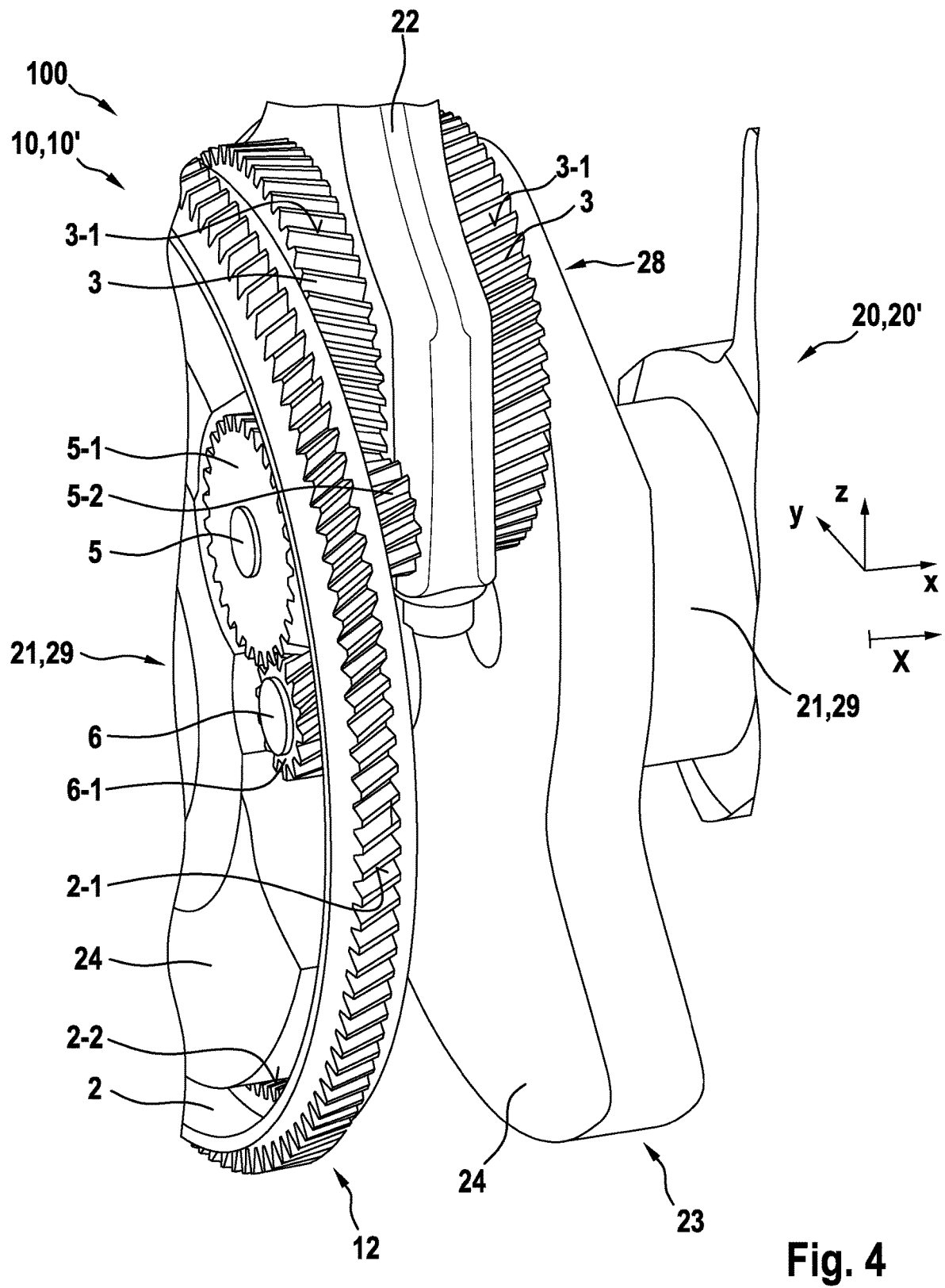
Figure 5:
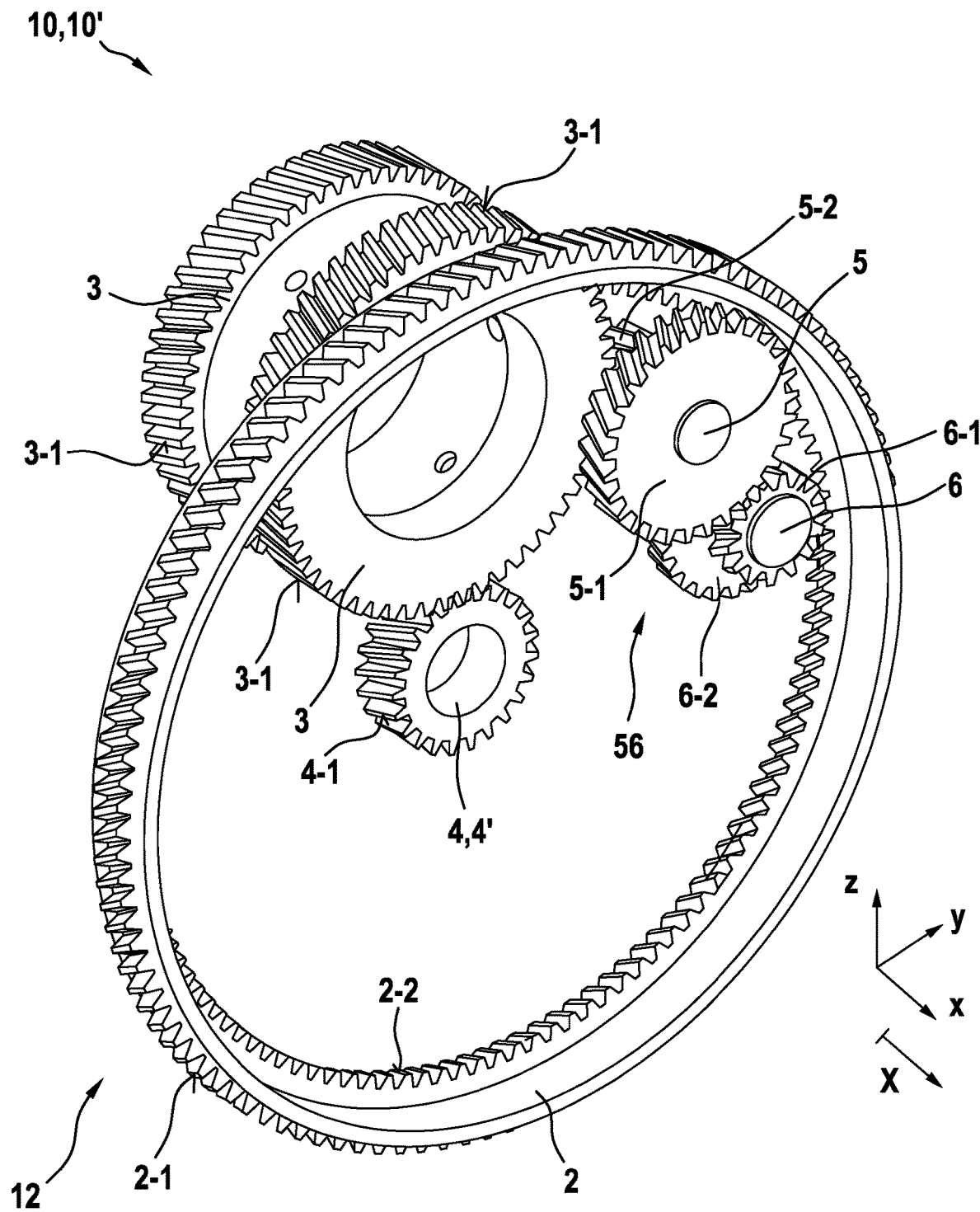

In conjunction with the further FIGS. 3 to 5 which show various perspective views of the embodiment of the apparatus 10 for changing a compression ratio according to FIG. 1, it becomes clear overall that the eccentric 3 is configured to capture the pin bearing journal or connecting rod bearing journal 28, and is configured with an external toothing system 3-1 for the rotation thereof and therefore for setting the compression ratio in an associated cylinder, namely via the stroke depth of the piston which is attached to the connecting rod 22.

An adjusting unit 12 is configured for the controlled rotation of the eccentric 3, which adjusting unit 12 consists, in the embodiment which is shown in FIG. 1, of an adjusting gear 2 which, via its external toothing system 2-1, can be rotated about a corresponding bearing in a meshing manner via an adjusting device 1, for example in the manner of a mechanism, a worm or rack and its worm thread or toothing system 1-1 in the interior of a crankcase of a crankshaft 20, which forms the basis, of a crank drive 20'.

The adjusting gear 2 of the adjusting unit 12 is therefore configured as an internal gear which, in addition to the external toothing system 2-1, also has an internal toothing system 2-2 which is coupled in a mechanically meshing manner into a coupling unit 56.

For coupling of this type, the coupling unit 56 has a first takeoff shaft 5 with first and second gearwheels 5-1 and 5-2 which are arranged fixedly on the shaft 5 for conjoint rotation. Furthermore, a second takeoff shaft 6 with first and second gearwheels 6-1 and 6-2 which are arranged fixedly on the shaft 6 for conjoint rotation is provided.

The two takeoff shafts 5 and 6 are spaced apart parallel to one another and parallel to the crankshaft 20 and crankshaft axis 21 and in each case radially to one another and are arranged in such a way (a) that the second gearwheel 6-2 of the second takeoff shaft 6 meshes with the internal toothing system 2-2, (b) that the first gearwheel 6-1 of the second takeoff shaft 6 meshes with the first gearwheel 5-1 of the first takeoff shaft 5, and (c) that the second gearwheel 5-2 of the first takeoff shaft 5 meshes with the external toothing system 3-1 of the eccentric 3, (d) with the result that overall, in the case of an actuation of the adjusting device 1, the eccentric 3 rotates via a rotation of the adjusting gear 2 and the subsequent rotations of the two takeoff shafts 5 and 6 and of the corresponding gearwheels 5-1 to 6-2, and therefore the effective piston stroke of the piston which is connected to the connecting rod 22 is varied.

It also becomes clear from FIGS. 1 and 3 to 5 that the external toothing system 3-1 of the eccentric 3 also meshes with a synchronizing toothing system 4-1 of a synchronizing gearwheel or a synchronizing mechanism 4', for example a synchronizing shaft 4 which supports the toothing system 4-1, in order to bring about a synchronization with further cylinders of the reciprocating piston internal combustion engine 100 via their eccentrics which are not shown here.

Pin bearing journals 28 or connecting rod bearing journals and the main bearing journals 29 can be seen in FIGS. 1 and 3 to 5.

Figure 2:
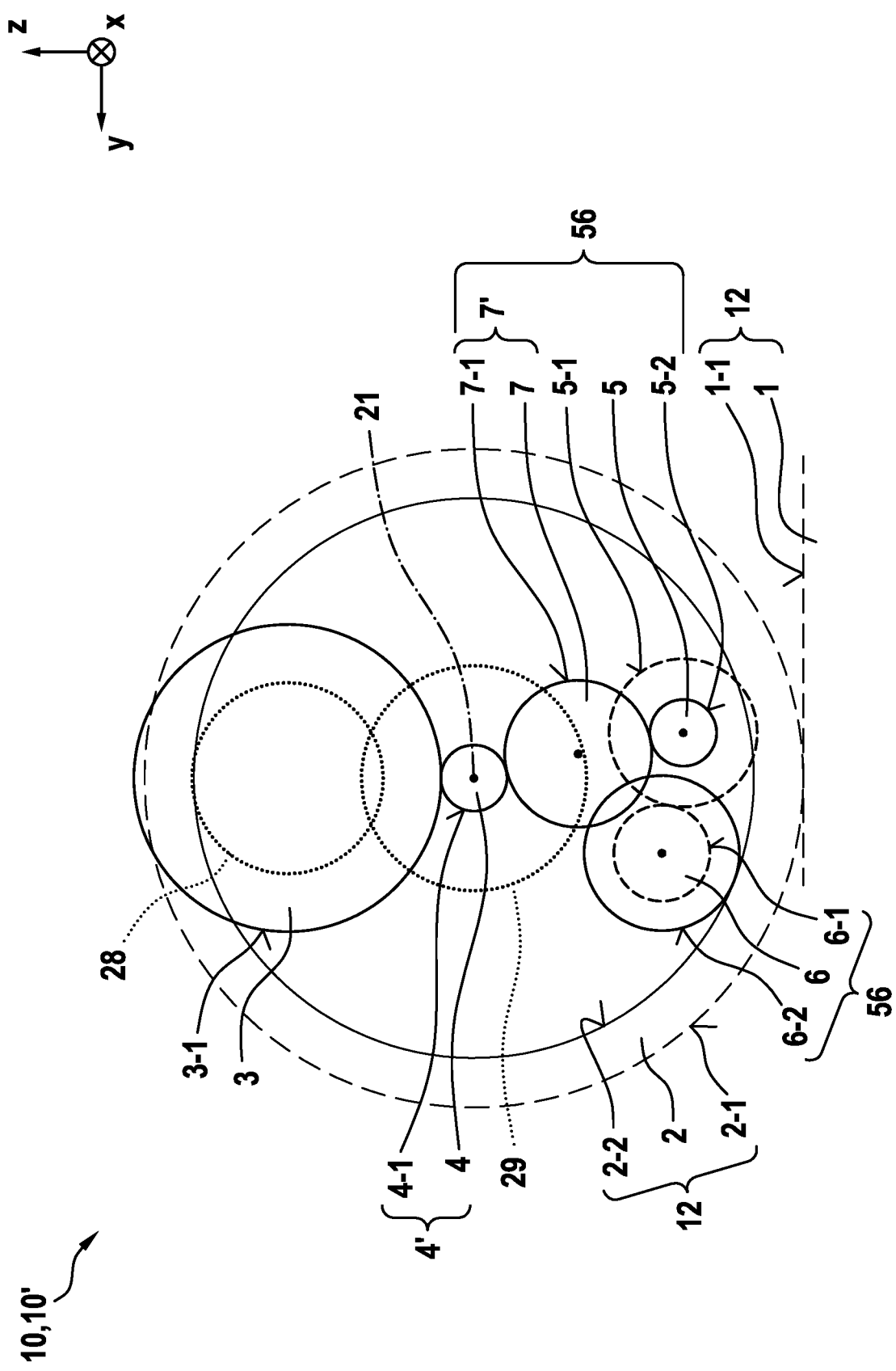
FIG. 2 shows an axial plan view of the apparatus for changing a compression ratio of a reciprocating piston internal combustion engine, an eccentric being driven and controlled with the use of an intermediate mechanism and a synchronizing mechanism.

FIG. 2 shows an axial plan view of another embodiment of the apparatus 10 for changing a compression ratio of a reciprocating piston internal combustion engine 100, an eccentric 3 being driven and controlled with use of an intermediate mechanism 4' and a synchronizing mechanism 7'.

In the case of said alternative arrangement of the apparatus 10 for changing a compression ratio of a reciprocating piston internal combustion engine 100, the second gearwheel 5-2 of the first takeoff shaft 5 does not mesh directly with the external toothing system 3-1 of the eccentric 3 as in the case of the embodiment according to FIGS. 1 and 3 to 5, but rather indirect mechanical coupling to the eccentric 3 is brought about as follows.

First of all, the second gearwheel 5-2 of the first takeoff shaft 5 meshes with the toothing system 7-1 of the intermediate mechanism 7' and, in particular, with a toothing system of a corresponding gearwheel on the intermediate shaft 7. Via the intermediate mechanism 7', the rotation of the first gearwheel 5-2 of the first takeoff shaft 5 is transmitted as a rotation to the synchronizing toothing system 4-1 of the synchronizing shaft 4 of the synchronizing mechanism 4'.

The synchronizing mechanism 4' then meshes via the synchronizing toothing system 4-1 with the external toothing system 3-1 of the eccentric 3, and sets the latter in rotation in order to set the compression ratio.

In the case of the arrangement of FIG. 2, the takeoff shafts 5 and 6 and the intermediate shaft 7 are situated at a position which lies diametrically opposite the pin bearing journal or connecting rod bearing journal 28 in relation to the crankshaft axis 21. Said shafts 5 to 7 are therefore arranged in the region of the counterweight 24 of the crankshaft webs 23.

As a consequence, the relevant mechanism components of the arrangements of the apparatuses 10 for changing a compression ratio according to FIGS. 1 to 5 are circulating adjusting mechanisms 10' which are arranged substantially in the installation space of the respective circulating crankshaft web 23 and, in particular, in the installation space of a circulating counterweight 24 of the crankshaft 20, which forms the basis, of the crank drive 20' of the reciprocating piston internal combustion engine 100, and likewise circulate there during operation.

The illustrations of FIGS. 1 to 5 do not explicitly show the contact face with the connecting rod eye, which contact face is eccentric with respect to the pin bearing journal 28, that is to say do not show the actual eccentric 3, since the disclosure relates essentially to the control of the eccentric 3.

The eccentric 3 rotates with a fixed phase and/or relative rotational speed with respect to the crankshaft, typically with a factor of +½ with respect to the rotational speed of the crankshaft. Here, the toothing systems ensure said ratios by way of suitable meshing with the stationary adjusting gear 2, the rotation of which via the adjusting device 1 then brings about the phase angle of the rotation of the eccentric 3 and therefore the setting of the compression ratio. Here, for example, the eccentric 3 can be set with a correspondingly available rotational angle relative to the ignition timing, and a compression which results therefrom.

These and further features and properties of the present disclosure will be described in further detail on the basis of the following statements:

The present disclosure also relates, in particular, to internal combustion engines 100 with an epicyclic mechanism 10' for compression adjustment and with a central (in relation to a crankshaft 20, which forms the basis, of a crank drive 20') adjusting drive via a takeoff shaft 5 which meshes with a small adjusting gear 5-2 on the outside on an external toothing system 3-1 on an eccentric 3.

As a result of the position of the adjusting gear 5-2 on the inside between a crankshaft web 23 and the bearing pedestal of the crankcase, weakening of said components traditionally occurs. Moreover, the bearing wall is displaced and is traditionally of narrower design in the region of the adjusting drive, with the result that, in the case of the procedure according to the prior art, complications can occur during the production, the assembly and/or during operation. Splitting of the adjusting gear and crankshaft 23 can also traditionally be forced.

Inter alia, an adjusting drive with a second takeoff shaft 6 is proposed according to the disclosure. Said second takeoff shaft 6 is driven by a large, internally toothed adjusting gear 2, and for its part drives the first takeoff shaft 5. The adjusting gear 2 can be positioned or oriented in angular terms in the crankcase, for example, via an outer worm 1, in order to set the desired compression. It can be threaded in closed form over the crankshaft 20 and can then be assembled with the latter in the crankcase. The two takeoff shafts 5 and 6 are mounted in the crankshaft 20 and are situated in the installation space of a web 23.

As can be seen from FIG. 1, the adjusting drive takes place, for example, by means of a worm drive 1 to an internal gear 2, to be precise by means of the external toothing system 2-1. Via the internal toothing system 2-2, the internal gear 2 drives a second takeoff gear 6-2 of a second takeoff shaft 6, on which a further, first gearwheel 6-1 drives the first takeoff shaft 5, the second gearwheel 5-1 of which is in engagement with the external toothing system 3-1 of the eccentric 3.

In the illustration of FIG. 1, the synchronizing toothing system 4-1 of the synchronizing mechanism 4' with the shaft 4 to further cylinders is still present.

The pin bearing journals 28 and main bearing journals 29 can also be seen.

Should the strength of the crankshaft 20 be excessively impaired in the case of the embodiment according to FIG. 1, the takeoff shafts 5 and 6 can also be arranged in the region of the counterweight 24, and can be coupled via a further gear 7-1 of an intermediate mechanism 7' to a shaft 7 with the synchronizing toothing system 4-1.

Advantages which are produced are, inter alia, a simplified overall design, a preservation of stability and/or strength of the crankshaft and the crankcase, smaller formations in the crankcase for the option with a variable compression ratio, and consumption and emissions advantages during operation.

LIST OF DESIGNATIONS

1 Adjusting device, drive, worm, rack
1-1 Toothing system, worm thread
2 Adjusting gear
2-1 External toothing system
2-2 Internal toothing system
3 Eccentric
3-1 External toothing system, eccentric 3
4 Synchronizing shaft
4' Synchronizing mechanism
4-1 Synchronizing toothing system, synchronizing gearwheel
5 (First) takeoff shaft
5-1 (First) toothing system/gearwheel of the (first) takeoff shaft 5
5-2 (Second) toothing system/gearwheel of the (first) takeoff shaft 5
6 (Second) takeoff shaft
6-1 (First) toothing system/gearwheel of the (second) takeoff shaft 6
6-2 (Second) toothing system/gearwheel of the (second) takeoff shaft 6
7 Intermediate shaft
7' Intermediate mechanism
7-1 Toothing system/gearwheel of the intermediate shaft 7
10 Apparatus for changing a compression ratio
10' (Epicyclic) adjusting mechanism
12 Adjusting unit
20 Crankshaft
20' Crank drive
21 Crankshaft axis
22 Connecting rod
23 Crankshaft web, web
24 Counterweight
28 Pin bearing journal, connecting rod bearing journal
29 Main bearing journal
56 Coupling unit
100 Reciprocating piston internal combustion engine, motor
x Spatial direction
X Longitudinal extent direction of the crankshaft/the crankshaft axis 21
y Spatial direction
z Spatial direction

What is claimed is:
1. An apparatus configured to change a compression ratio of a reciprocating piston internal combustion engine, the apparatus comprising:
an externally toothed eccentric which is configured to be arranged in a rotationally movable manner between a pin journal of a crankshaft of a crank drive and a connecting rod eye of a connecting rod in order to change a stroke height of a piston of the reciprocating piston internal combustion engine, which piston is coupled mechanically to the connecting rod;

an adjusting unit which is coupled mechanically to an external toothing system of the eccentric and is configured to set the eccentric by way of rotation of the eccentric, and a coupling unit which is configured to couple the eccentric mechanically to the adjusting unit and to first and second takeoff shafts which are arranged parallel to one another, are spaced apart radially from one another, and are coupled mechanically to one another, wherein the first takeoff shaft is coupled mechanically to the external toothing system of the eccentric, the second takeoff shaft is coupled mechanically to the adjusting unit, and the first and second takeoff shafts of the coupling unit, the eccentric and/or the adjusting unit are configured for the partial or complete arrangement in the interior of a crankcase of the crankshaft, within an installation space of a web of the crankshaft and/or within an installation space of a counterweight, the adjusting unit has an adjusting hear which is configured as an internal gear with an external toothing system configured to receive an adjusting movement for the eccentric, and is configured with an internal toothing system fixedly with respect to the external toothing system for conjoint rotation for mechanical coupling to the coupling unit, the coupling unit, the eccentric and/or the adjusting unit are/is configured for the partial or complete arrangement: (i) in the interior of a crankcase of the crankshaft, (ii) within an installation space of a web of the crankshaft, and/or (iii) within an installation space of a counterweight, and/or the coupling unit is arranged partially or completely in the interior of the installation space of the adjusting gear.

2. An apparatus configured to change a compression ratio of a reciprocating piston internal combustion engine, the apparatus comprising:

an externally toothed eccentric which is configured to be arranged in a rotationally movable manner between a pin journal of a crankshaft of a crank drive and a connecting rod eye of a connecting rod in order to change a stroke height of a piston of the reciprocating piston internal combustion engine, which piston is coupled mechanically to the connecting rod, an adjusting unit which is coupled mechanically to an external toothing system of the eccentric and is configured to set the eccentric via rotation of the eccentric, and a coupling unit configured to couple the eccentric mechanically to the adjusting unit, wherein the adjusting unit has an adjusting gear which is configured as an internal gear with an external toothing system configured to receive an adjusting movement for the eccentric, and is configured with an internal toothing system fixedly with respect to the external toothing system for conjoint rotation for mechanical coupling to the coupling unit, and (i) the coupling unit, the eccentric and/or the adjusting unit are configured for the partial or complete arrangement: (a) in the interior of a crankcase of the crankshaft, (b) within an installation space of a web of the crankshaft, and/or (c) within an installation space of a counterweight, and/or (ii) the coupling unit is arranged partially or completely in the interior of an installation space of the adjusting gear.

3. The apparatus according to claim 2, wherein when the coupling unit is configured for coupling the eccentric mechanically to the adjusting unit via first and second takeoff shafts which: i) are arranged parallel to one another, ii) are spaced apart radially from one another, and iii) are coupled mechanically to one another.

4. The apparatus according to claim 3, wherein when the coupling unit is configured as a mechanism unit which circulates partially or completely: (a) in the interior space of the crankcase, (b) in the installation space of a web of the crankshaft, and/or (c) in the installation space of a counterweight, the first takeoff shaft of the coupling unit is configured to be arranged spaced apart in parallel and radially with respect to a rotational axis of the crankshaft, and has an externally toothed first gearwheel for the rotation of the eccentric, and a second gearwheel which is offset axially and is fixed with respect to the first gearwheel of the first takeoff shaft for conjoint rotation, and/or the second takeoff shaft of the coupling unit is configured to be arranged spaced apart in parallel and radially with respect to the rotational axis of the crankshaft and with respect to the first takeoff shaft, and an externally toothed first gearwheel is configured so as to mesh with the second gearwheel of the first takeoff shaft and, offset axially and fixedly with respect to the first gearwheel of the second takeoff shaft for conjoint rotation, so as to mesh with an externally toothed second gearwheel.

5. The apparatus according to claim 4, wherein the second gearwheel of the second takeoff shaft is arranged so as to mesh on the internal toothing system of the adjusting gear, the external toothing system of the adjusting gear is arranged so as to engage with an adjusting device, and/or the adjusting gear is configured for rotatable mounting in the interior space of a crankcase of the reciprocating piston internal combustion engine.

6. The apparatus according to claim 5, further comprising:

an intermediate mechanism that is configured as part of the coupling unit, with an externally toothed intermediate gearwheel, an intermediate shaft which supports an externally toothed intermediate gearwheel, and/or spaced apart in parallel and radially with respect to the crankshaft axis and/or with respect to the first and second takeoff shaft, wherein the intermediate mechanism is set up to bring about, indirectly or directly, mechanical coupling and meshing of the first gearwheel of the first takeoff shaft, to/with the external toothing system of the eccentric.

7. The apparatus according to claim 6, further comprising:

a synchronizing mechanism that is configured as part of the coupling unit and/or an intermediate mechanism, with an externally toothed synchronizing gearwheel, a synchronizing shaft which supports an externally toothed synchronizing gearwheel, and/or spaced apart in parallel and/or in a coinciding manner or radially with respect to the crankshaft axis, with respect to any intermediate shaft and/or with respect to the first and second takeoff shaft, in order to change a compression ratio of further cylinders of the reciprocating piston internal combustion engine, wherein the synchronizing mechanism is set up to bring about, indirectly or directly, mechanical coupling and meshing of the synchronizing gearwheel to/with the external toothing system of the eccentric in order to be driven by way of this, and in addition to/with the coupling unit, the intermediate mechanism and/or the intermediate gearwheel in order to drive the eccentric.

8. A reciprocating piston internal combustion engine, comprising:
the apparatus according to claim 7 configured to change a compression ratio of the reciprocating piston internal combustion engine;
a crank drive with a crankshaft with at least one pin journal which is mounted on both sides in a rotationally movable manner; and
the pin journal:
(i) being operatively connected to a connecting rod and a piston which is arranged in a cylinder of the reciprocating piston internal combustion engine such that it is slidingly movable, and
(ii) being configured for the conversion of a rotational movement of the crankshaft into a bidirectional, translational movement of the piston with a defined stroke height.

9. The reciprocating piston internal combustion engine according to claim 8, wherein:
(a) an eccentric of the crank drive rotates with a relative and/or controllably adjustable phase and/or relative rotational speed with respect to the rotation of the crankshaft, with a factor of $+\frac{1}{2}$ with respect to the rotational speed of the crankshaft,
(b) toothing systems ensure said ratios via meshing with a stationary adjusting gear of the apparatus for changing a compression ratio, and/or
(c) the phase angle of the rotation of the eccentric and therefore the setting of the compression ratio is brought about via a rotation of the adjusting gear via the adjusting device of the apparatus for changing a compression ratio, and
(d) the eccentric is set via a correspondingly present rotational angle relative to the ignition time via a resulting compression.

10. A working apparatus with a reciprocating piston internal combustion engine which is configured as a drive means for an assembly of the working apparatus according to claim 9.

* * * * *